US008959377B2

(12) United States Patent
Li

(10) Patent No.: US 8,959,377 B2
(45) Date of Patent: Feb. 17, 2015

(54) SYSTEM FOR SUPPLYING OPERATING VOLTAGE TO CENTRAL PROCESSING UNIT

(75) Inventor: Ji-Chao Li, Shenzhen (CN)

(73) Assignees: Hong Fu Jin Precision Industry (ShenZhen) Co., Ltd,., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 343 days.

(21) Appl. No.: 13/598,854

(22) Filed: Aug. 30, 2012

(65) Prior Publication Data

US 2013/0346765 A1 Dec. 26, 2013

(30) Foreign Application Priority Data

Jun. 21, 2012 (CN) .......................... 2012 1 0206815

(51) Int. Cl.
*G06F 1/26* (2006.01)

(52) U.S. Cl.
USPC .............. 713/340; 713/300; 713/320; 361/88

(58) Field of Classification Search
USPC ............................ 713/300, 320, 340; 361/88
See application file for complete search history.

(56) References Cited

U.S. PATENT DOCUMENTS

| | | | | |
|---|---|---|---|---|
| 4,833,563 | A * | 5/1989 | Russell | 361/92 |
| 7,343,503 | B2 * | 3/2008 | Huang | 713/320 |
| 7,613,002 | B2 * | 11/2009 | Ye et al. | 361/708 |
| 7,728,619 | B1 * | 6/2010 | Tzou et al. | 326/30 |

* cited by examiner

*Primary Examiner* — Thuan Du
(74) *Attorney, Agent, or Firm* — Novak Druce Connolly Bove + Quigg LLP

(57) ABSTRACT

A central processing unit (CPU) power controller includes a power supply unit, a CPU power controller, a detecting circuit, a temperature compensation circuit, an inductor, a thermistor, first and second switches, and first and second capacitors. The detecting circuit outputs a detected voltage of an inductor to the CPU power controller. The temperature compensation circuit outputs a detected voltage of the thermistor to the CPU power controller, to compensate for changes in the voltage of the inductor. If the detected voltage is greater than the rated voltage, the first switch is opened and the second switch is closed. The inductor discharges. If the detected voltage of the inductor is less than the rated voltage, the first switch is closed and the second switch is opened, the power supply unit charges the inductor to increase the voltage of the CPU.

3 Claims, 1 Drawing Sheet

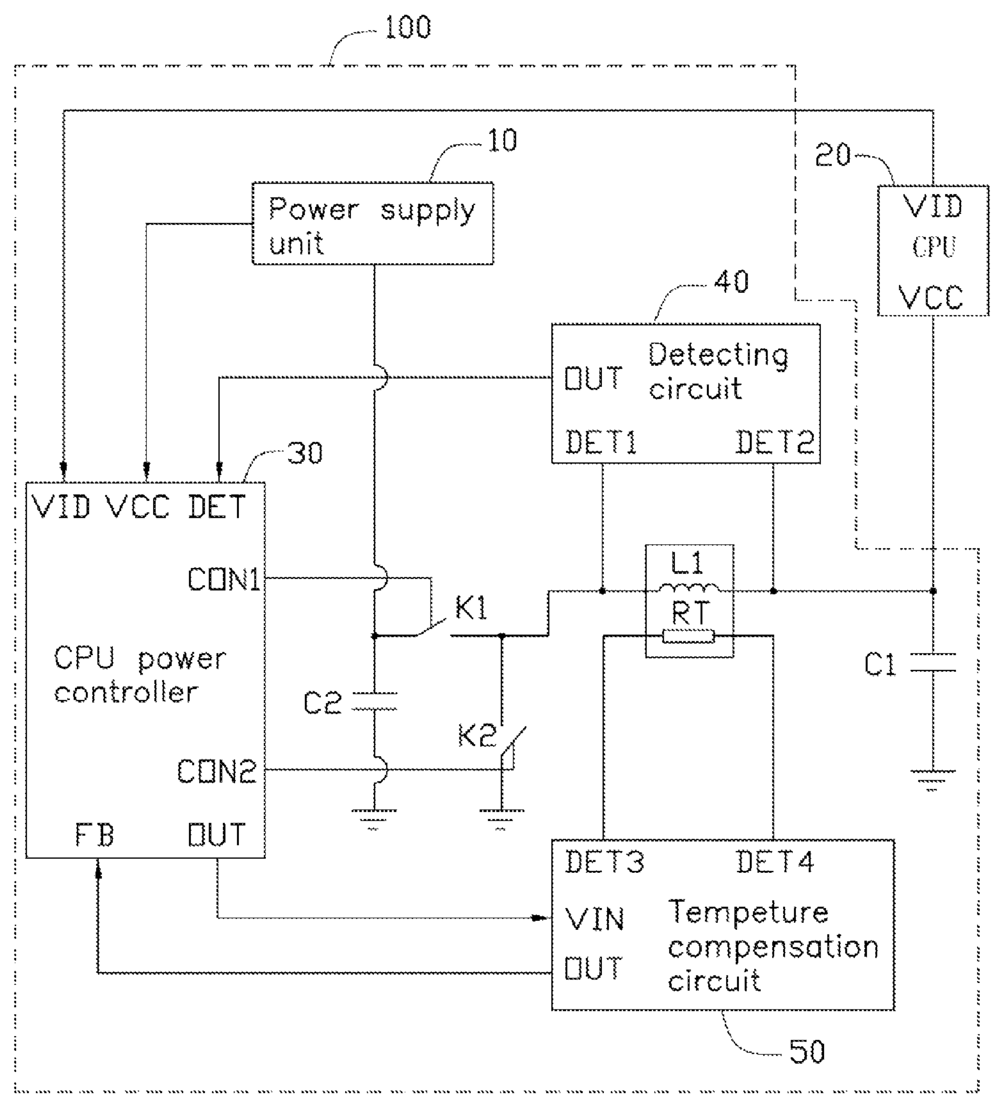
100
10
Power supply unit
20
VID
CPU
VCC
40
OUT
Detecting circuit
DET1
DET2
30
VID VCC DET
CON1
CPU power controller
CON2
FB
OUT
K1
K2
C2
L1
RT
C1
DET3
DET4
VIN
OUT
Tempeture compensation circuit
50

SYSTEM FOR SUPPLYING OPERATING VOLTAGE TO CENTRAL PROCESSING UNIT

BACKGROUND

1. Technical Field

The present disclosure relates to a system for supplying operating voltage to a central processing unit (CPU), and particularly to a system for supplying operating voltage to a CPU without the influence of the surrounding temperature.

2. Description of Related Art

Like other electronic components on a motherboard, the CPU must work with an operating voltage which is supplied by the motherboard. Different kinds of CPUs have different operating voltages, so a CPU power supply circuit is set on the motherboard for supplying an operating voltage suitable for the CPU. In related art, the CPU power supply circuit detects an output voltage of a power supply unit of the motherboard and compares the detected voltage with a rated voltage of the CPU, to regulate the output voltage of the power supply unit to a suitable voltage for the CPU. When the computer is running, surrounding temperature of the motherboard increases. This increase in temperature may result in the voltages detected by the CPU power supply circuit to be an erroneous. The CPU power supply circuit detects an imprecise output voltage of the power supply unit, and cannot regulate the voltage of the CPU correctly. So the CPU, or even the motherboard, may be damaged.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments.

The figure is a circuit diagram of a system for supplying operating voltage to a CPU in accordance with an exemplary embodiment of the present disclosure.

DETAILED DESCRIPTION

The disclosure, including the drawing, is illustrated by way of example and not by way of limitation. References to "an" or "one" embodiment in this disclosure are not necessarily to the same embodiment, and such references mean "at least one".

Referring to the figure, a system 100 for supplying operating voltage to a central processing unit (CPU) 20 in accordance with an exemplary embodiment includes a power supply unit 10, a CPU power controller 30, a detecting circuit 40, a temperature compensation circuit 50, switches K1 and K2, an inductor L1, a thermistor RT packaged with the inductor L1, and capacitors C1 and C2. The power supply unit 10 converts an external alternating current (AC) power to a direct current (DC) power and provides the DC power to all modules of a computer. In one embodiment, resistance of the thermistor RT decreases when surrounding temperature increases. The detecting circuit 40 detects a voltage of the inductor L1. The temperature compensation circuit 50 detects a voltage of the thermistor RT. The detecting circuit 40 and the temperature compensation circuit 50 are known in the art.

A voltage setting pin VID of the CPU power controller 30 is connected to a voltage setting pin VID of the CPU 20, to receive a voltage from the voltage setting pin VID of the CPU 20 and convert the voltage to a rated voltage of the CPU 20. A voltage pin VCC of the CPU power controller 30 is connected to the power supply unit 10, to receive a voltage from the power supply unit 10. A detecting pin DET of the CPU power controller 30 is connected to an output pin OUT of the detecting circuit 40. A control pin CON1 of the CPU power controller 30 is connected to a control terminal of the switch K1. A first terminal of the switch K1 is connected to the power supply unit 10. A second terminal of the switch K1 is connected to a first terminal of the switch K2 and also connected to a voltage pin VCC of the CPU 20 through the inductor L1. Two detecting pins DET1 and DET2 of the detecting circuit 40 are connected to two ends of the inductor L1. The capacitor C1 is connected between the voltage pin VCC of the CPU 20 and ground. The capacitor C2 is connected between the first terminal of the switch K1 and ground. The control pin CON2 of the CPU power controller 30 is connected to a control terminal of the switch K2. A second terminal of the switch K2 is grounded. The output pin OUT of the CPU power controller 30 is connected to an input pin VIN of the temperature compensation circuit 50. A feedback pin FB of the CPU power controller 30 is connected to an output pin OUT of the temperature compensation circuit 50. Two detecting pins DET3 and DET4 of the temperature compensation circuit 50 are connected to two ends of the thermistor RT.

In use, when the computer is powered on, the CPU power controller 30 receives a voltage from the voltage setting pin VID of the CPU 20 and converts the voltage to the rated voltage of the CPU 20. The CPU power controller 30 controls the switch K1 to be closed through the control pin CON1 and controls the switch K2 to be opened through the control pin CON2. The power supply unit 10 provides an output voltage to the CPU 20 through the inductor L1. The detecting circuit 40 detects a voltage of the inductor L1 through the detecting pins DET1 and DET2 and outputs the detected voltage to the CPU power controller 30. The CPU power controller 30 compares the detected voltage with the rated voltage of the CPU 20. If the detected voltage is greater than the rated voltage, the CPU power controller 30 controls the switch K1 to open and controls the switch K2 to close. The inductor L1 discharges through the switch K2, reducing the voltage output to the voltage pin VCC of the CPU 20. If the detected voltage is less than the rated voltage, the CPU power controller 30 controls the switch K1 to close and controls the switch K2 to open. The power supply 10 charges the inductor L1 to increase a voltage output to the voltage pin VCC of the CPU 20. Thus, the CPU 20 is always operating on a correct voltage.

As the computer continues to work, surrounding temperature of the computer increases due to thermal affect of current. The increasing temperature causes changes in the resistance of the inductor L1. The voltage of the inductor L1 detected by the detecting circuit 40 increases due to the changing of resistances of inductor L1. The voltage of the thermistor RT detected by the temperature compensation circuit 50 through the detecting pins DET3 and DET4 after the output pin OUT of the CPU power controller 30 outputs a voltage to the thermistor RT through the temperature compensation circuit 50. Because the resistance of the thermistor RT decreases when surrounding temperature increases, the voltage of the thermistor RT decreases correspondingly. The temperature compensation circuit 50 detects the voltage of the thermistor RT and outputs the detected voltage to the CPU power controller 30, to compensate for the voltage of the inductor L1 detected by the detecting circuit 40. So the CPU power controller 30 can detect an exact voltage of the inductor L1 through the detecting circuit 40, to regulate the voltage of the CPU 20 correctly.

The system 100 can detect an exact voltage of the inductor L1 through the detecting circuit 40 and the temperature compensation circuit 50 when the surrounding temperature changes, to regulate the voltage of the CPU 20 correctly despite changes in the surrounding temperature.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A system for supplying an operating voltage to a central processing unit (CPU) of a motherboard, the system comprising:

a power supply unit;

an inductor;

a thermistor;

a first switch comprising a first terminal connected to the power supply unit, a second terminal connected to a voltage pin of the CPU through the inductor, and a control terminal;

a second switch comprising a first terminal connected to the second terminal of the first switch, a second terminal grounded, and a control terminal;

a first capacitor connected between the voltage pin of the CPU and ground;

a second capacitor connected between the first terminal of the first switch and ground;

a detecting circuit comprising first and second detecting pins connected to two ends of the inductor, and an output pin;

a temperature compensation circuit comprising third and fourth detecting pins connected to two ends of the thermistor, an input pin, and an output pin; and a CPU power controller comprising:

a voltage setting pin connected to a voltage setting pin of the CPU, to receive a voltage from the CPU and convert the voltage from the CPU to a rated voltage of the CPU;

a voltage pin connected to the power supply unit, to receive a voltage;

a detecting pin connected to the output pin of the detecting circuit;

a first control pin connected to the control terminal of the first switch;

a second control pin connected to the control terminal of the second switch;

a feedback pin connected to the output pin of the temperature compensation circuit; and an output pin connected to the input pin of the temperature compensation circuit; wherein when the motherboard is powered on, the CPU power controller controls the first switch to close through the first control pin and controls the second switch to open through the second control pin, the power supply unit provides a voltage to the CPU through the inductor, the detecting circuit detects a voltage of the inductor through the first and second detecting pins of the detecting circuit and outputs the detected voltage to the CPU power controller, the output pin of the CPU power controller outputs a voltage to the thermistor through the temperature compensation circuit, the temperature compensation circuit detects the voltage of the thermistor through the third and fourth detecting pins of the temperature compensation circuit and outputs the detected voltage to the CPU power controller, to compensate for the changes in voltage of the inductor, the CPU power controller compares the detected voltage of the inductor with the rated voltage of the CPU, upon condition that the detected voltage of the inductor is greater than the rated voltage, the CPU power controller controls the first switch to open and controls the second switch to close, the inductor discharges through the second switch for reducing the voltage of the voltage pin of the CPU, upon condition that the detected voltage of the inductor is less than the rated voltage, the CPU power controller controls the first switch to close and controls the second switch to open, the power supply unit charges the inductor to increase the voltage of the voltage pin of the CPU.

2. The system of claim 1, wherein resistance of the thermistor decreases when surrounding temperature increases.

3. The system of claim 1, wherein the thermistor is packaged with the inductor.

* * * * *